US011683427B2

(12) United States Patent
Shimazu

(10) Patent No.: US 11,683,427 B2
(45) Date of Patent: Jun. 20, 2023

(54) RECORDING APPARATUS

(71) Applicant: Seiko Epson Corporation, Tokyo (JP)

(72) Inventor: Masamitsu Shimazu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/646,838

(22) Filed: Jan. 3, 2022

(65) Prior Publication Data

US 2022/0131990 A1 Apr. 28, 2022

Related U.S. Application Data

(63) Continuation of application No. 17/069,369, filed on Oct. 13, 2020, now Pat. No. 11,252,293, which is a continuation of application No. 16/575,485, filed on Sep. 19, 2019, now Pat. No. 10,841,443.

(30) Foreign Application Priority Data

Sep. 20, 2018 (JP) .................................. 2018-176197
May 7, 2019 (JP) .................................. 2019-087780

(51) Int. Cl.
*H04N 1/00* (2006.01)
(52) U.S. Cl.
CPC ..... *H04N 1/00594* (2013.01); *H04N 1/00543* (2013.01); *H04N 1/00588* (2013.01); *H04N 1/00602* (2013.01); *H04N 1/00604* (2013.01); *H04N 1/00623* (2013.01)
(58) Field of Classification Search
CPC .......... B65H 2301/133; B65H 2402/45; B65H 2403/942; B65H 2407/21; B65H 29/125; B65H 29/58; H04N 1/00543; H04N 1/00588; H04N 1/00594; H04N 1/00602; H04N 1/00604; H04N 1/00623
USPC ........................................................ 358/301
See application file for complete search history.

(56) References Cited

U.S. PATENT DOCUMENTS 5,613,783 A * 3/1997 Kinney .................... B41J 11/48
400/73
5,832,338 A 11/1998 Kuga
6,846,064 B2 * 1/2005 Yamane ..................... B41J 2/15
347/41

(Continued)

FOREIGN PATENT DOCUMENTS

JP 2010-008586 1/2010
JP 2018-174519 11/2018

*Primary Examiner* — Negussie Worku
(74) *Attorney, Agent, or Firm* — Workman Nydegger

(57) ABSTRACT

A recording apparatus includes: a recording unit that performs recording on a medium; a medium discharging section that discharges the medium on which recording has been performed; a medium receiving section that receives the medium discharged by the medium discharging section; a face-down discharge path that guides, to the medium discharge section, the recorded medium with a recorded side thereof facing downward; a document movement path that is provided at an upper part of a housing constituting an outer casing of the recording apparatus and along which a document moves; and a reading unit provided in the document movement path to read the document. The medium receiving section also serves as a support tray that supports the document to be inserted into the document movement path or the document exiting from the document movement path.

20 Claims, 8 Drawing Sheets

(56) References Cited

U.S. PATENT DOCUMENTS

| | | | |
|---|---|---|---|
| 8,651,637 | B2 | 2/2014 | Ishibe et al. |
| 8,767,065 | B2 * | 7/2014 | Yamamoto ................ B41J 2/01 347/108 |
| 2002/0135821 | A1 | 9/2002 | Sekine |
| 2011/0097093 | A1 | 4/2011 | Birumachi |
| 2012/0195668 | A1 | 8/2012 | Yamamoto |
| 2014/0009777 | A1 | 1/2014 | Shimazu |
| 2015/0123343 | A1 | 5/2015 | Sei |
| 2015/0336386 | A1 | 11/2015 | Shimazu |
| 2016/0067972 | A1 | 3/2016 | Tanjo |
| 2017/0203575 | A1 | 7/2017 | Shimazu |
| 2018/0009226 | A1 | 1/2018 | Shimazu et al. |
| 2018/0281430 | A1 * | 10/2018 | Ohta .................. H04N 1/00591 |
| 2019/0283465 | A1 * | 9/2019 | Miyazawa ........... B41J 11/0015 |
| 2019/0308425 | A1 * | 10/2019 | Otsuka ............... B41J 13/0045 |
| 2020/0092433 | A1 * | 3/2020 | Shimazu ................ B65H 29/52 |
| 2020/0099811 | A1 * | 3/2020 | Shimazu ........... H04N 1/00543 |
| 2021/0122172 | A1 * | 4/2021 | Otsuka .................. B41J 13/106 |

\* cited by examiner

RECORDING APPARATUS

The present application is a continuation of U.S. patent application Ser. No. 17/069,369, filed Oct. 13, 2020, which is a continuation of U.S. patent application Ser. No. 16/575,485, filed Sep. 19, 2019 and granted on Nov. 17, 2020 as U.S. Pat. No. 10,841,443, which claims priority to JP Patent Application Nos. 2018-176197, filed Sep. 20, 2018, and 2019-087780, filed May 7, 2019, the disclosures of which are incorporated by reference herein in their entireties.

BACKGROUND

1. Technical Field

The present disclosure relates to a recording apparatus that performs recording on a medium.

2. Related Art

A so-called multifunction apparatus, which functions as both a printer and a scanner, has been known, and JP-A-2010-008586 discloses an example of the multifunction apparatus.

In an image reading/recording apparatus disclosed in JP-A-2010-008586, an image reading device is provided above an image recording device. The image reading device is of a flat-bed type and is provided so as to project toward the front side with respect to the image recording device. Because a recording-sheet discharge tray that receives discharged recording sheets is provided at the top of the image recording device, and the image reading device is disposed with respect to the image recording device as described above, the recording-sheet discharge tray is exposed without being covered by the image reading device.

In the image reading/recording apparatus disclosed in JP-A-2010-008586, the image reading device is provided so as to project toward the front side with respect to the image recording device. Hence, the size of the overall image reading/recording apparatus in the front-rear direction is large.

SUMMARY

According to an aspect of the present disclosure, a recording apparatus includes: a recording unit that performs recording on a medium; a medium discharging section that discharges the medium on which recording has been performed; a medium receiving section that receives the medium discharged by the medium discharging section; a face-down discharge path that guides, to the medium discharge section, the recorded medium with a recorded side thereof facing downward; a document movement path that is provided at an upper part of a housing constituting an outer casing of the recording apparatus and along which a document moves; and a reading unit provided in the document movement path to read the document. The medium receiving section also serves as a support tray that supports the document to be inserted into the document movement path or the document exiting from the document movement path.

DESCRIPTION OF EXEMPLARY EMBODIMENTS

Figure 1:
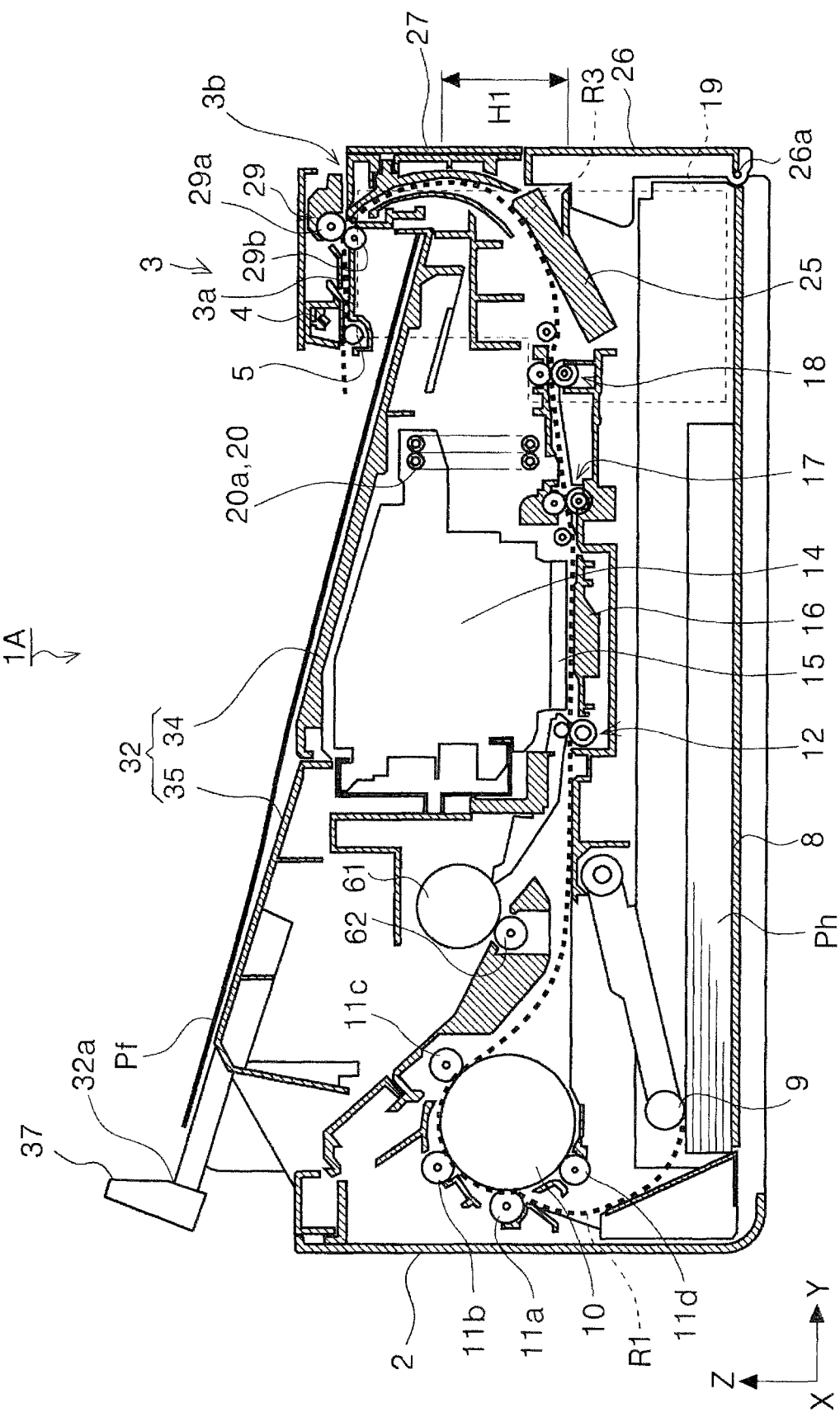
FIG. 1 is a vertical sectional view showing a sheet transport path of a printer.

The outline of the present disclosure will be described below.

A recording apparatus according to the first aspect includes: a recording unit that performs recording on a medium; a medium discharging section that discharges the medium on which recording has been performed; a medium receiving section that receives the medium discharged by the medium discharging section; a face-down discharge path that guides, to the medium discharge section, the recorded medium with a recorded side thereof facing downward; a document movement path that is provided at an upper part of a housing constituting an outer casing of the recording apparatus and along which a document moves; and a reading unit provided in the document movement path to read the document. The medium receiving section also serves as a support tray that supports the document to be inserted into the document movement path or the document exiting from the document movement path.

According to this aspect, because the document reading mechanism of the recording apparatus is not of a flat-bed type, but of a sheet feed type, in which a document is scanned while being transported relative to a fixed reading unit, the length of the document reading mechanism in the document transport direction can be made smaller than the length of the document to be scanned. Because the document reading mechanism of this type is provided at the upper part of the housing constituting the outer casing of the recording apparatus, it is possible to ensure a sufficient area for the medium receiving section without causing the document reading mechanism to project toward the front side or the rear side of the recording apparatus and to improve ease of taking out the medium discharged on the medium receiving section.

In addition, because the medium receiving section also serves as a support tray that supports the document to be inserted into the document movement path and the document exiting from the document movement path, the cost of the apparatus is reduced.

In the second aspect, in the first aspect, the document movement path may be a horizontal path.

According to this aspect, because the document movement path is a horizontal path, it is easy to insert the document into the document movement path.

The term "horizontal path" above does not necessarily mean a perfectly horizontal path, and it can mean a slightly inclined path that is deviated from a perfectly horizontal path to some extent; that is, it can include some error.

In the third aspect, in the second aspect, the reading unit may be located above the document movement path.

According to this aspect, because the reading unit is located above the document movement path, the document can be inserted into the document movement path with the reading surface of the document facing up. Because this allows a user to view the reading surface of the document, the usability is high.

In the fourth aspect, in the second or third aspect, the medium discharging section may be located on a front side in an apparatus depth direction and may discharge the medium toward a rear side of the recording apparatus. The medium receiving section may be located on the rear side of the recording apparatus with respect to the medium discharging section. An opening through which the document is inserted into the document movement path may be provided in a front surface of the recording apparatus. The medium discharging section may also serve as a document feeder that guides the document inserted through the opening toward the reading unit.

According to this aspect, because the medium discharging section also serves as the document feeder that feeds the document inserted from the opening toward the reading unit, the cost of the apparatus is reduced.

In the fifth aspect, in the fourth aspect, the medium moving from the recording unit to the medium discharging section through the face-down discharge path may receive a transport force from the medium discharging section and may be transported to a position facing the reading unit.

According to this aspect, because the medium moving from the recording unit to the medium discharging section through the face-down discharge path receives a transport force from the medium discharging section and is transported to the position facing the reading unit, it is also possible to read the medium moving from the recording unit to the medium discharging section through the face-down discharge path, which improves the usability.

In the sixth aspect, in any one of the first to fifth aspects, the medium receiving section and the document movement path may partially overlap each other in a vertical direction.

According to this aspect, because the medium receiving section and the document movement path partially overlap each other in the vertical direction, the vertical dimension of the recording apparatus is reduced.

In the seventh aspect, in any one of the first to sixth aspects, the recording apparatus may further include a medium feed path along which the medium fed from a medium container located below the recording unit is reversed along a curved path and is guided to the recording unit. The medium feed path and the face-down discharge path may partially overlap each other in a vertical direction.

According to this aspect, because the medium feed path and the face-down discharge path partially overlap each other in the vertical direction, the vertical dimension of the recording apparatus is reduced.

In the eighth aspect, a recording apparatus includes: a recording unit that performs recording on a medium; a medium discharging section that discharges the medium on which recording has been performed; and a medium discharge path that guides the medium on which recording has been performed by the recording unit to the medium discharging section. A reading unit that reads a document is provided in the medium discharge path.

According to this aspect, the document reading mechanism of the recording apparatus is not of a flat-bed type, but of a sheet feed type, in which a document is scanned while being transported relative to a fixed reading unit. Because the document reading mechanism of this type is provided in the medium discharge path that guides the medium on which recording has been performed by the recording unit to the medium discharging section, the overall apparatus can be made compact. In addition, it is possible to ensure a sufficient area for the medium receiving section that receives the discharged medium, improving ease of taking out the discharged medium.

In the ninth aspect, in the eighth aspect, the recording apparatus may further include a face-up discharge path along which the medium on which recording has been performed by the recording unit is discharged with a most-recently recorded side thereof facing up without being reversed along a curved path. The medium discharge path may be configured as a face-down discharge path along which the medium on which recording has been performed by the recording unit is reversed along a curved path and is guided to the medium discharging section with the most-recently recorded side thereof facing inside. The reading unit may be provided at an upstream position in the face-down discharge path, through which position the medium discharged through the face-up discharge path passes.

According to this aspect, in either case where the face-down discharge path is selected or the face-up discharge path is selected, the reading unit can read the side of the medium, improving the usability.

In the tenth aspect, a recording apparatus includes: a carriage including a recording unit that performs recording on a medium, the carriage moving in a width direction intersecting a medium transport direction in which the medium is transported when the recording unit performs recording on the medium; a medium discharging section that discharges the medium on which recording has been performed; a medium receiving section that receives the medium discharged by the medium discharging section; a face-down discharge path that guides, to the medium discharge section, the recorded medium with a recorded side thereof facing downward; a document movement path along which a document moves; and a reading unit provided in the document movement path to read the document. The carriage and the reading unit partially overlap each other in a vertical direction.

According to this aspect, because the document reading mechanism of the recording apparatus is not of a flat-bed type, but of a sheet feed type, in which a document is scanned while being transported relative to a fixed reading unit, the length of the document reading mechanism in the document transport direction can be made smaller than the length of the document to be scanned. Because the document reading mechanism of this type is provided, it is possible to ensure a sufficient area for the medium receiving section without causing the document reading mechanism to project toward the front side or the rear side of the recording apparatus and to improve ease of taking out the medium discharged on the medium receiving section.

In addition, because the carriage and the reading unit partially overlap each other in the vertical direction, the vertical dimension of the recording apparatus is reduced.

In the eleventh aspect, in any one of the first, eighth, and tenth aspects, the recording apparatus may further include a transport roller pair that is located immediately downstream the recording unit in a medium transport path and that transports the medium to a downstream side in the transport path. The reading unit may be located on a front side of the recording apparatus with respect to the transport roller pair in an apparatus depth direction.

According to this aspect, with the configuration in which the reading unit is located on the front side of the recording apparatus with respect to the transport roller pair in the apparatus depth direction, the advantageous effects described in any of the first, eighth, and tenth aspects can be obtained.

In the twelfth aspect, in any one of the first, eighth, and tenth aspects, the recording apparatus may further include, below the recording unit, a medium container that accommodates the medium to be fed. The reading unit and the medium container may partially overlap each other in an apparatus depth direction.

According to this aspect, because the reading unit and the medium container partially overlap each other in the apparatus depth direction, the depth dimension of the recording apparatus is reduced.

In the thirteenth aspect, in the first or tenth aspect, the reading unit and the face-down discharge path may partially overlap each other in an apparatus depth direction.

According to this aspect, because the reading unit and the face-down discharge path partially overlap each other in the apparatus depth direction, the depth dimension of the recording apparatus is reduced.

In the fourteenth aspect, in any one of the first, eighth, and tenth aspects, the reading unit may be located vertically below a downstream end of the medium receiving section in a medium discharging direction.

According to this aspect, because the reading unit is located vertically below the downstream end of the medium receiving section in the medium discharging direction, the vertical dimension of the recording apparatus is reduced.

In the fifteenth aspect, in the first or tenth aspect, an opening from which the document is inserted into the document movement path may be located vertically below a downstream end of the medium receiving section in a medium discharging direction.

According to this aspect, because the opening from which the document is inserted into the document movement path is located vertically below the downstream end of the medium receiving section in the medium discharging direction, the vertical dimension of the recording apparatus is reduced.

In the sixteenth aspect, in any one of the first, eighth, and tenth aspects, the reading unit may be located on a rear side of the recording apparatus with respect to the medium discharging section in an apparatus depth direction.

According to this aspect, because the reading unit is located on the rear side of the recording apparatus with respect to the medium discharging section in the apparatus depth direction, the depth dimension of the recording apparatus is reduced.

In the seventeenth aspect, in any one of the first, eighth, and tenth aspects, the recording apparatus may further include an insertion port from which a medium to be fed is inserted. At least a portion of the reading unit may be located below the insertion port in a vertical direction.

According to this aspect, because at least a portion of the reading unit is located below the insertion port in the vertical direction, the vertical dimension of the recording apparatus is reduced.

In the eighteenth aspect, in the first or tenth aspect, the recording apparatus may further include a face-up discharge path along which the medium on which recording has been performed by the recording unit is discharged with a most-recently recorded side thereof facing up without being reversed along a curved path. At least a portion of the reading unit may be located vertically below a medium discharging position in the face-up discharge path.

According to this aspect, because at least a portion of the reading unit is located vertically below the medium discharging position in the face-up discharge path, the vertical dimension of the recording apparatus is reduced.

In the nineteenth aspect, in any one of the first, eighth, and tenth aspects, the recording apparatus may further include a liquid container that contains liquid to be discharged from a liquid discharge head, the liquid container being provided outside a carriage that includes the recording unit and that moves in a width direction intersecting a medium transport direction in which the medium is transported when the recording unit performs recording on the medium. The recording unit may be configured as the liquid discharge head that discharges liquid. The liquid container and the carriage may be connected to each other by a tube constituting a liquid flow path. The tube may have a deformable section that deforms as the carriage moves. At least a portion of the reading unit may be located on a front side of the recording apparatus with respect to the deformable section of the tube in an apparatus depth direction.

According to this aspect, with the configuration in which at least a portion of the reading unit is located on the front side of the recording apparatus with respect to the deformable section of the tube in the apparatus depth direction, the advantageous effects described in any of the first, eighth, and tenth aspects can be obtained.

In the twentieth aspect, in any one of the first, eighth, and tenth aspects, the recording apparatus may further include a liquid container that contains liquid to be discharged from a liquid discharge head, the liquid container being provided outside a carriage that includes the recording unit and that moves in a width direction intersecting a medium transport direction in which the medium is transported when the recording unit performs recording on the medium. The recording unit may be configured as the liquid discharge head that discharges liquid. The liquid container and the carriage may be connected to each other by a tube constituting a liquid flow path. The tube may have a deformable section that deforms as the carriage moves. At least a portion of the reading unit may be located above the deformable section of the tube in a vertical direction.

According to this aspect, with the configuration in which at least a portion of the reading unit is located above the deformable section of the tube in the vertical direction, the advantageous effects described in any of the first, eighth, and tenth aspects can be obtained.

In the twenty-first aspect, in any one of the first, eighth, and tenth aspects, the recording apparatus may further include a liquid container that contains liquid to be discharged from a liquid discharge head, the liquid container being provided outside a carriage that includes the recording unit and that moves in a width direction intersecting a medium transport direction in which the medium is transported when the recording unit performs recording on the medium. The recording unit may be configured as the liquid discharge head that discharges liquid. The reading unit and the liquid container may at least partially overlap each other in a vertical direction.

According to this aspect, because the reading unit and the liquid container at least partially overlap each other in the vertical direction, the vertical dimension of the recording apparatus is reduced.

In the twenty-second aspect, in any one of the first, eighth, and tenth aspects, the recording apparatus may further include a liquid container that contains liquid to be discharged from a liquid discharge head, the liquid container being provided outside a carriage that includes the recording unit and that moves in a width direction intersecting a medium transport direction in which the medium is transported when the recording unit performs recording on the medium. The recording unit may be configured as the liquid discharge head that discharges liquid. The reading unit and the liquid container may at least partially overlap each other in the apparatus depth direction.

According to this aspect, because the reading unit and the liquid container at least partially overlap each other in the apparatus depth direction, the depth dimension of the recording apparatus is reduced.

In the twenty-third aspect, in the twenty-first or twenty-second aspect, the liquid container may be located beside the reading unit in an apparatus width direction intersecting an apparatus depth direction.

According to this aspect, with the configuration in which the liquid container is located beside the reading unit in the apparatus width direction intersecting the apparatus depth direction, the advantageous effects obtained in the twenty-first or twenty-second aspect can be obtained.

The present disclosure will be described in detail below.

Although an ink jet printer 1A (hereinbelow, simply, a printer 1A), serving as an example of a recording apparatus of the present disclosure, will be described below as an example, the method for performing recording on a sheet, serving as an example of a medium, is not limited to the ink jet method, and various other methods, such as an electrophotographic method and a dot impact method, may also be employed.

There are multiple types of ink jet printers, such as one in which an ink cartridge is loaded on a carriage and one in which a carriage and an ink container provided outside the carriage are connected to each other by an ink tube. The present disclosure may be applied to either type. The printer 1A according to this embodiment is of the latter type, in which a carriage and an ink container provided outside the carriage are connected to each other by an ink tube.

In the X-Y-Z coordinate system in the drawings: the X direction corresponds to the apparatus width direction, which is also the sheet width direction; the Y direction corresponds to the apparatus front-rear direction (depth direction), which is also the sheet transport direction in which a sheet is transported during recording; and the Z direction corresponds to the apparatus height direction, which is also the vertical direction. The +Y direction is the direction from the rear surface to the front surface of the apparatus, and the −Y direction is the direction from the front surface to the rear surface of the apparatus.

A user faces the front surface of the apparatus. The configuration and the exterior design of the apparatus determine which side surface of the apparatus is to serve as the front surface. For example, when an operating section having various operation buttons and a display is provided for a user to enter instructions, the side provided with the operating section often faces the user.

Furthermore, hereinbelow, the side to which a sheet is transported is referred to as the "downstream side", and the side from which the sheet is transported is referred to as the "upstream side".

In FIG. 1, the printer 1A includes, in a housing 2 constituting the outer casing of the recording apparatus, a reading unit 4, serving as a document reading unit (described below). Hence, the printer 1A is a so-called multifunction apparatus.

In the housing 2, near the front side of the apparatus, an operating section (not shown) is provided. The operating section includes a power button and various operation buttons. What is meant by "near the front side of the apparatus" is a position on the front side of the apparatus with respect to the center in the apparatus depth direction.

A first cover 26 and a second cover 27 are provided in front surface of the housing 2. A user can solve a paper jam occurring in a face-down discharge path (first sheet discharge path R3, described below) by opening the second cover 27.

Furthermore, face-up discharging (described below) is enabled by opening the first cover 26 and opening a path-switching flap 25, serving as a path-switching member.

Figure 2:
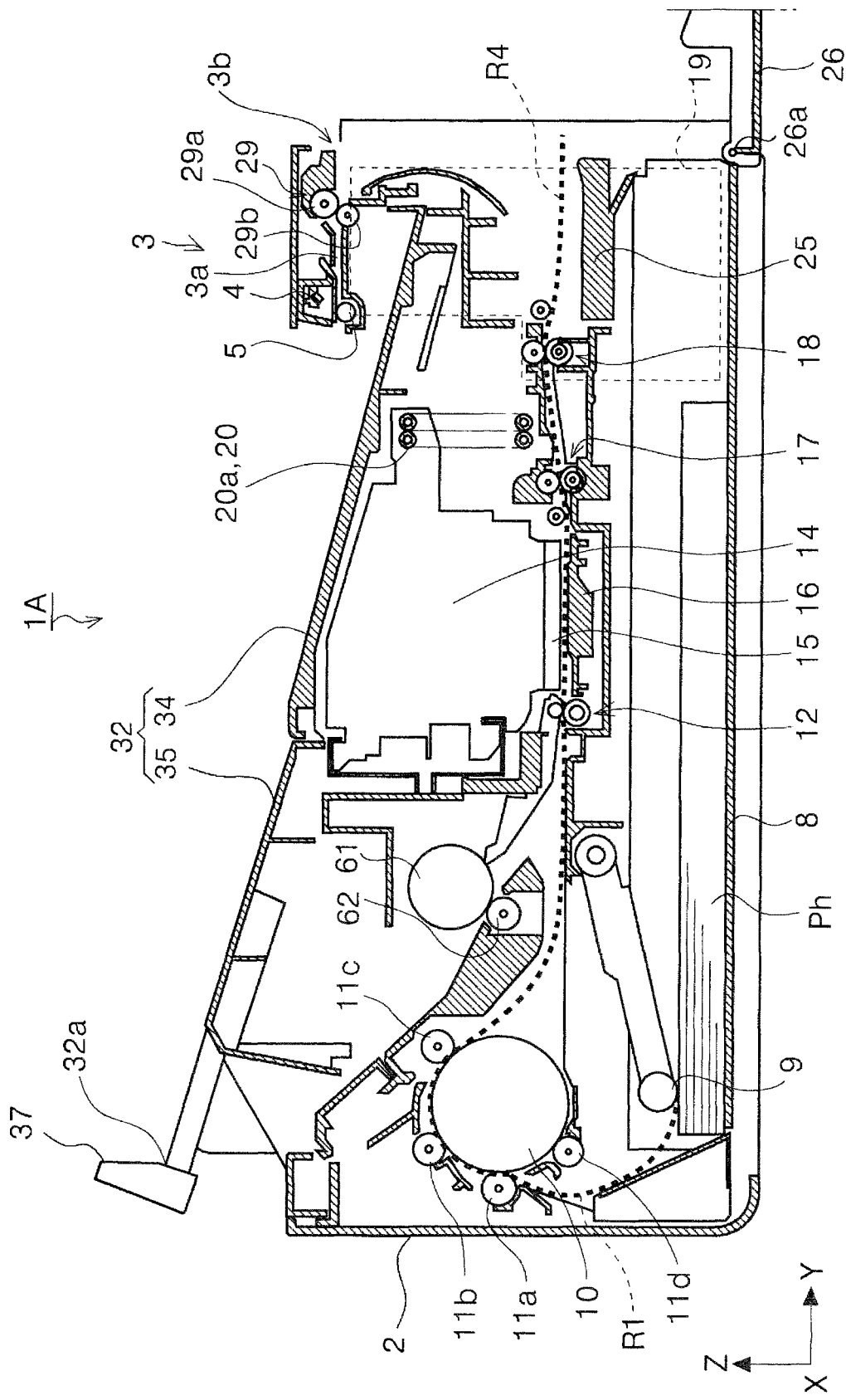
FIG. 2 is a vertical sectional view showing a sheet transport path of the printer.

The first cover 26 is pivoted about a pivot shaft 26a when opened and closed. The second cover 27 is pivoted about the pivot shaft 26a, in conjunction with the first cover 26, when opened and closed. FIG. 2 shows a state in which the first cover 26 and the second cover 27 are pivoted, in conjunction with each other, open.

In a state in which the first cover 26 and the second cover 27 are pivoted, in conjunction with each other, open, the first cover 26 and the second cover 27 serve as a sheet receiving portion that receives a sheet discharged through a second sheet discharge path R4 (FIG. 2), serving as a face-up discharge path (described below).

Next, sheet paths in the printer 1A will be described.

Figure 3:
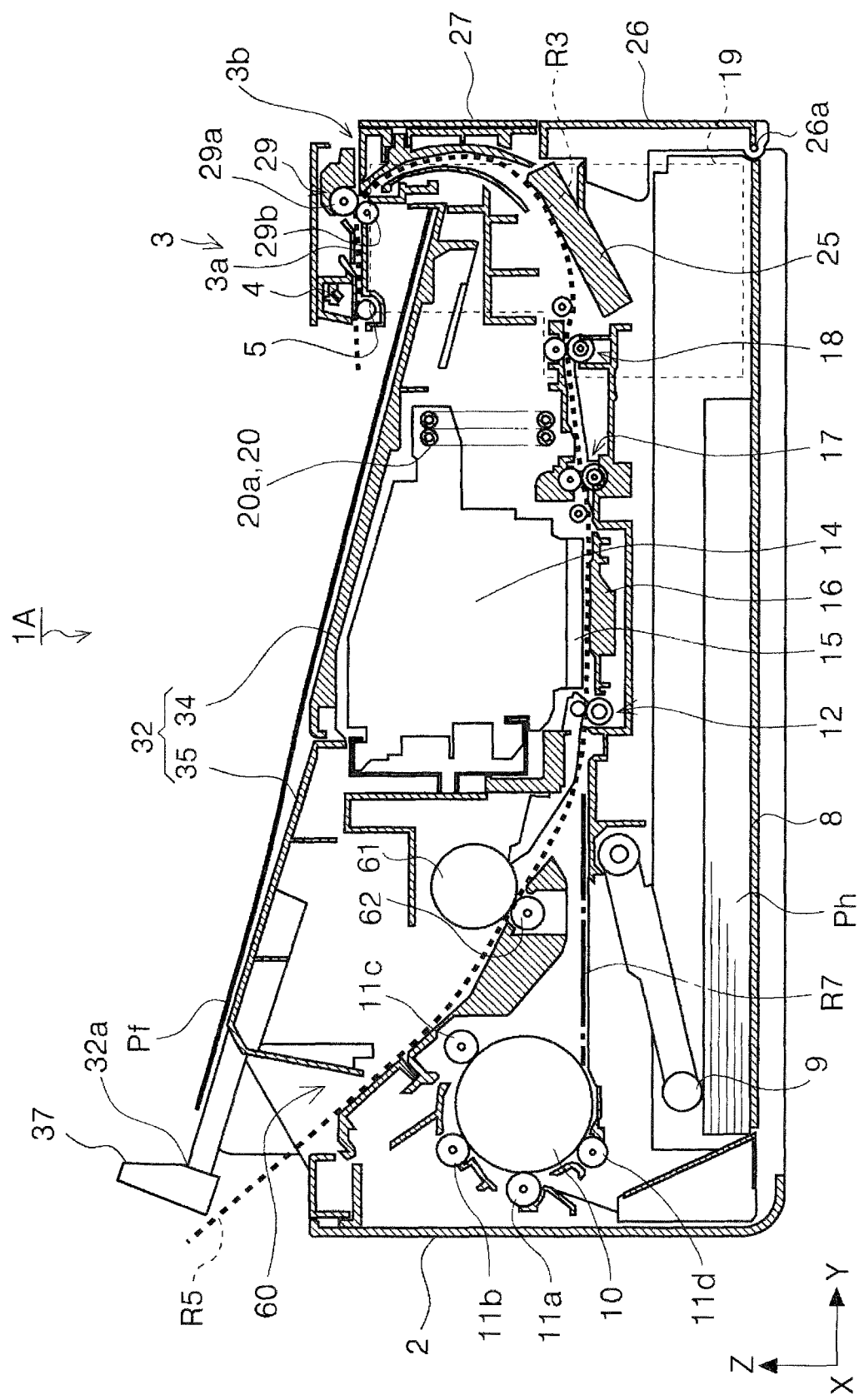
FIG. 3 is a vertical sectional view showing a sheet transport path of the printer.

Dashed lines and a one-dot chain line in FIGS. 1 to 3 show the sheet paths. More specifically, reference sign R1 in FIG. 1 denotes a sheet feed path. In this embodiment, the sheet feed path R1 extends from a sheet container 8 to a transport roller pair 12.

Reference sign R3 denotes a first sheet discharge path, serving as a face-down discharge path. The first sheet discharge path R3 extends from a second intermediate roller pair 18 to a discharge roller pair 29.

Reference sign R5 in FIG. 3 denotes a sheet feed path. The sheet feed path R5 is a path along which a sheet fed from a feed port 60 provided on the rear side of the apparatus is guided to the transport roller pair 12 via a feed roller 61.

Reference sign R7 in FIG. 3 denotes a switchback path. The switchback path R7 extends from the transport roller pair 12 to a driven roller 11a via a driven roller 11d. The switchback path R7 is used when a sheet is reversed for duplex printing.

A more detailed description will be given below. The sheet container 8 that can accommodate a plurality of sheets is provided at the bottom of the housing 2. A sheet in the sheet container 8 is fed downstream by a pickup roller 9 driven by a motor (not shown). Reference sign Ph in FIG. 1 denotes an example of sheets accommodated in the sheet container 8.

A reversing roller 10 driven by a motor (not shown) is provided downstream of the pickup roller 9, and the sheet fed from the sheet container 8 is reversed along a curved path by the reversing roller 10 and is guided to the transport roller pair 12 on the downstream side, which is driven by a motor (not shown).

The reversing roller 10 is surrounded by driven rollers 11a, 11b, 11c, and 11d that urge the sheet against the reversing roller 10.

The driven rollers 11a, 11b, and 11c are provided in the sheet feed path R1, and the driven roller 11d is provided in the switchback path R7 (FIG. 3).

A sheet support portion 16, which supports a sheet, and a recording head 15, serving as an example of a recording unit and a liquid discharge head that discharge ink onto the sheet to perform recording, are provided so as to face each other, on the downstream side of the transport roller pair 12. The ink is an example of liquid. The recording head 15 is provided on the carriage 14, and the carriage 14 is driven in a reciprocating motion in the sheet width direction by a motor (not shown).

An ink tank 19 (see FIG. 8), serving as a liquid container, is provided outside the carriage 14. The ink tank 19 and the carriage 14 are connected to each other by a tube 20, which constitutes an ink flow path. The tube 20 has a deformable section 20a (see FIG. 8), which is deformed by the movement of the carriage 14. The deformable section 20a has a section in which the tube 20 is curved in a C-shape.

Figure 8:
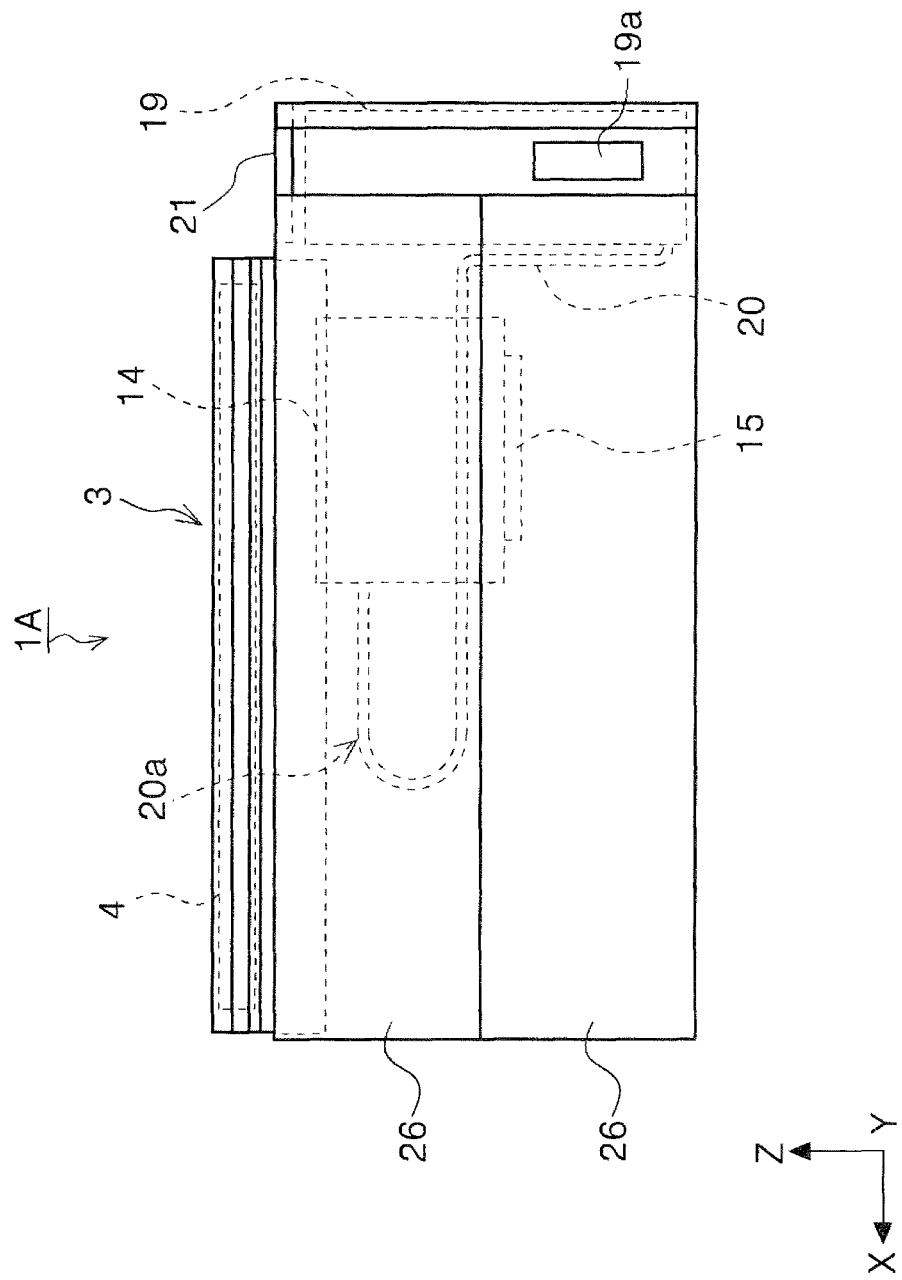
FIG. 8 is a front view of the printer.

In FIG. 8, the ink tank 19 has an ink-level checking portion 19a in the front surface thereof, which enables a user to view the position of the liquid surface inside the ink tank 19. Furthermore, an upper cover 21 is provided at the top of the ink tank 19. By opening the upper cover 21, the ink tank 19 can be refilled with ink.

Referring back to FIG. 1, a first intermediate roller pair 17 is provided immediately downstream of the recording head 15, and the second intermediate roller pair 18 is provided downstream of the first intermediate roller pair 17. The sheet on which recording has been performed is guided downstream by the first intermediate roller pair 17 and the second intermediate roller pair 18.

The path-switching flap 25 is provided downstream of the second intermediate roller pair 18. The path-switching flap 25 is provided so as to be pivotable about a pivot shaft (not shown). In this embodiment, the path-switching flap 25 is pivoted by a user's operation.

The printer 1A has two choices of sheet discharge path: one is the first sheet discharge path R3 (FIG. 1), serving as the face-down discharge path, through which a recorded sheet is discharged with the most-recently recorded side facing down; and the other is the second sheet discharge path R4 (FIG. 2), serving as the face-up discharge path, through which a recorded sheet is discharged with the most-recently recorded side facing up.

When the first sheet discharge path R3, serving as the face-down discharge path, is used, the path-switching flap 25 is held inclined (first state), as shown in FIG. 1. When the second sheet discharge path R4, serving as the face-up discharge path, is used, the path-switching flap 25 is held horizontally (second state), as shown in FIG. 2.

In this embodiment, the path-switching flap 25 is held inclined by a snap-fit mechanism (not shown) and is held horizontally by a support portion (not shown).

The discharge roller pair 29, serving as a sheet discharging section, is provided at the end of the first sheet discharge path R3, along which the sheet is reversed along a curved path. The discharge roller pair 29 includes a discharging driving roller 29a driven by a motor (not shown) and a discharging driven roller 29b that is rotated in a driven manner.

The sheet discharged by the discharge roller pair 29 is held on the sheet receiving portion 32, serving as a medium receiving section. The top surface of the sheet receiving portion 32 serves as a sheet receiving surface that receives the discharged sheet.

In this embodiment, the sheet receiving portion 32 includes, from the upstream side to the downstream side, a first discharged-sheet tray 34 and a second discharged-sheet tray 35. The top surfaces of the first discharged-sheet tray 34 and the second discharged-sheet tray 35 constitute the sheet receiving surface. Reference sign Pf in FIG. 1 denotes an example of a sheet held on the sheet receiving surface.

The first discharged-sheet tray 34 can be pivoted open or closed about a pivot shaft (not shown). By opening the first discharged-sheet tray 34, access to the carriage 14 and its surroundings becomes possible.

A stopper 37 with which the leading end of the discharged sheet comes into contact is provided downstream of the sheet receiving portion 32 to restrict the position of the leading end of the sheet. The stopper 37 prevents the discharged sheet from projecting beyond the sheet receiving portion 32.

Now, a document reading mechanism of the printer 1A will be described below.

A reading mechanism 3 that reads a document is provided at the upper part of the housing 2, above the first sheet discharge path R3, serving as the face-down discharge path, along which the sheet having gone through recording by the recording head 15 is reversed along a curved path and is guided to the discharge roller pair 29 with the most-recently recorded side facing inside.

The reading mechanism 3 includes a document movement path 3a, along which the document is transported. The reading unit 4, serving as the document reading unit, is provided in the document movement path 3a. In this embodiment, the reading unit 4 is a contact image sensor (CIS) module.

Figure 4:
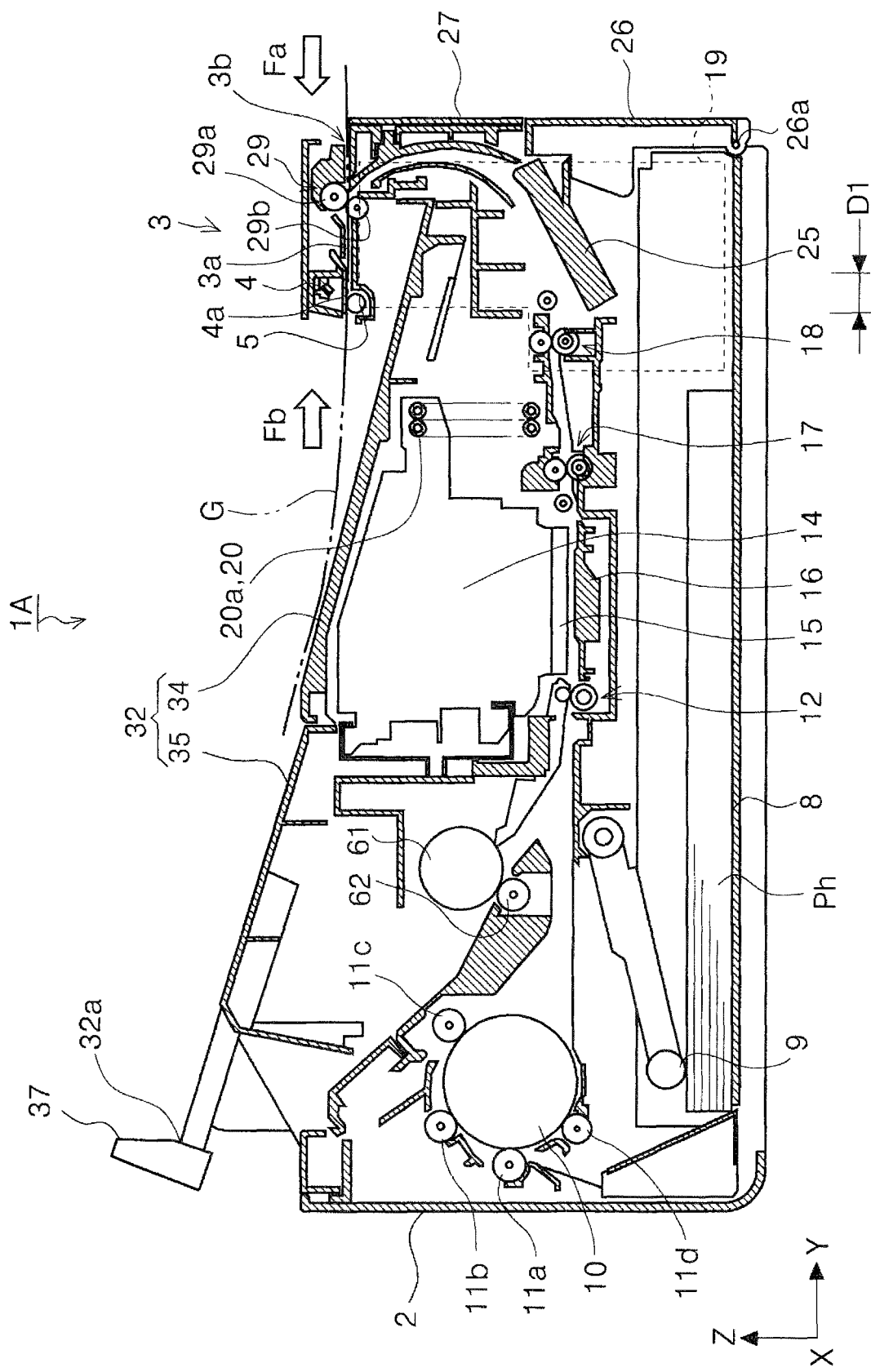
FIG. 4 is a vertical sectional view showing a sheet transport path of the printer.

As shown in FIG. 4, the sheet receiving portion 32 also serves as a support tray that supports a document to be fed into the document movement path 3a and that supports a document exiting from the document movement path 3a. Reference sign G in FIG. 4 indicates a document movement track. Arrow Fa in FIG. 4 indicates the direction in which the document is fed to the reading mechanism 3 so as to move toward the rear side of the apparatus, and arrow Fb indicates the direction in which the document is fed to the reading mechanism 3 so as to move toward the front side of the apparatus.

A transport roller 5 is provided at a position facing the reading unit 4. The reading unit 4 has a reading glass portion 4a at a position facing the transport roller 5. As the transport roller 5 rotates with the document being nipped between the transport roller 5 and the reading glass portion 4a, the document is transported. When the transport roller 5 is rotated counterclockwise in FIG. 4 by a motor (not shown), the document is transported toward the rear side of the apparatus. When the transport roller 5 is rotated clockwise in FIG. 4, the document is transported toward the front side of the apparatus.

The rotation direction of the transport roller 5 may be determined based on which of sensors, which are provided in front of and behind the transport roller 5 to detect the leading end of the document, has detected the leading end of the document. For example, when the sensor provided on the front side of the apparatus with respect to the transport roller 5 has detected the leading end of the document, it is determined that the document has been inserted from the front surface of the apparatus so as to move toward the rear side. Hence, the transport roller 5 is rotated counterclockwise in FIG. 4. When the sensor provided on the rear side of the apparatus with respect to the transport roller 5 has detected the leading end of the document, it is determined that the document has been inserted from the rear side of the apparatus so as to move toward the front side. Hence, the transport roller 5 is rotated clockwise in FIG. 4.

However, the number of directions from which the document can be inserted may be one, instead of two as described above.

This configuration provides advantageous effects as follows. The reading mechanism 3 is not of a flat-bed type, but of a sheet feed type, in which a document moves relative to the fixed reading unit 4 during scanning. Hence, the length of the reading mechanism 3 in the document transport direction is smaller than the length of the document to be scanned. Because this reading unit 4 is provided at the upper part of the housing 2 constituting the outer casing of the recording apparatus, it is possible to ensure a sufficient area for the sheet receiving portion 32 without causing the reading unit 4 to project toward the front side or the rear side of the recording apparatus, and thus to improve ease of taking out the sheet discharged on the sheet receiving portion 32.

In addition, because the sheet receiving portion 32 also serves as a support tray that supports a document to be inserted into the document movement path 3*a* and that supports a document exiting from the document movement path 3*a*, the cost of the apparatus is reduced.

In this embodiment, because the document movement path 3*a* is a horizontal path, it is easy to insert a document into the document movement path 3*a*.

The term "horizontal path" above does not necessarily mean a perfectly horizontal path, and it can mean a slightly inclined path that is deviated from a perfectly horizontal path to some extent; that is, it can include some error.

In this embodiment, because the reading unit 4 is located above the document movement path 3*a*, the document can be inserted into the document movement path with the reading surface of the document facing up. Because this allows a user to view the reading surface of the document, the usability is high.

In this embodiment, the discharge roller pair 29 is located on the front side in the apparatus depth direction and discharges the sheet toward the rear side of the apparatus, and the sheet receiving portion 32 is located on the rear side of the apparatus with respect to the discharge roller pair 29. Because the front surface of the apparatus has an opening 3*b* from which the document is inserted into the document movement path 3*a*, and the discharge roller pair 29 also serves as a document feeder that feeds the document inserted from the opening 3*b* toward the reading unit 4, the cost of the apparatus is reduced.

Reference sign G in FIG. 4A denotes a document movement track when the document is transported horizontally. As is clear from FIG. 1, the sheet that has reached the discharge roller pair 29 via the first sheet discharge path R3, serving as the face-down discharge path, receives a transport force from the discharge roller pair 29 and is transported to the position facing the reading unit 4.

Because it is also possible to read a sheet that has just been subjected to recording, the usability is high.

In this embodiment, because the sheet receiving portion 32 and the document movement path 3*a* partially overlap each other in the vertical direction, the vertical dimension of the recording apparatus is reduced.

In this embodiment, as shown in FIG. 1, because the sheet feed path R1 and the first sheet discharge path R3, serving as the face-down discharge path, partially overlap each other in the vertical direction, the vertical dimension of the recording apparatus is reduced. In FIG. 1, the sheet feed path R1 and the first sheet discharge path R3 overlap each other at area H1.

In this embodiment, although the reading unit 4 is provided above the document movement path 3*a*, the reading unit 4 may be provided below the document movement path 3*a*. Alternatively, as in a printer 1B shown in FIG. 5, the reading units 4 may be provided both above and below the document movement path 3*a* to read both sides of a document.

In the printer 1A, a recorded sheet can be guided to the switchback path R7 (FIG. 3) to be reversed. Hence, even when the reading unit 4 is provided either above or below the document movement path 3*a*, it is possible to read a desired side of the sheet.

Figure 6:
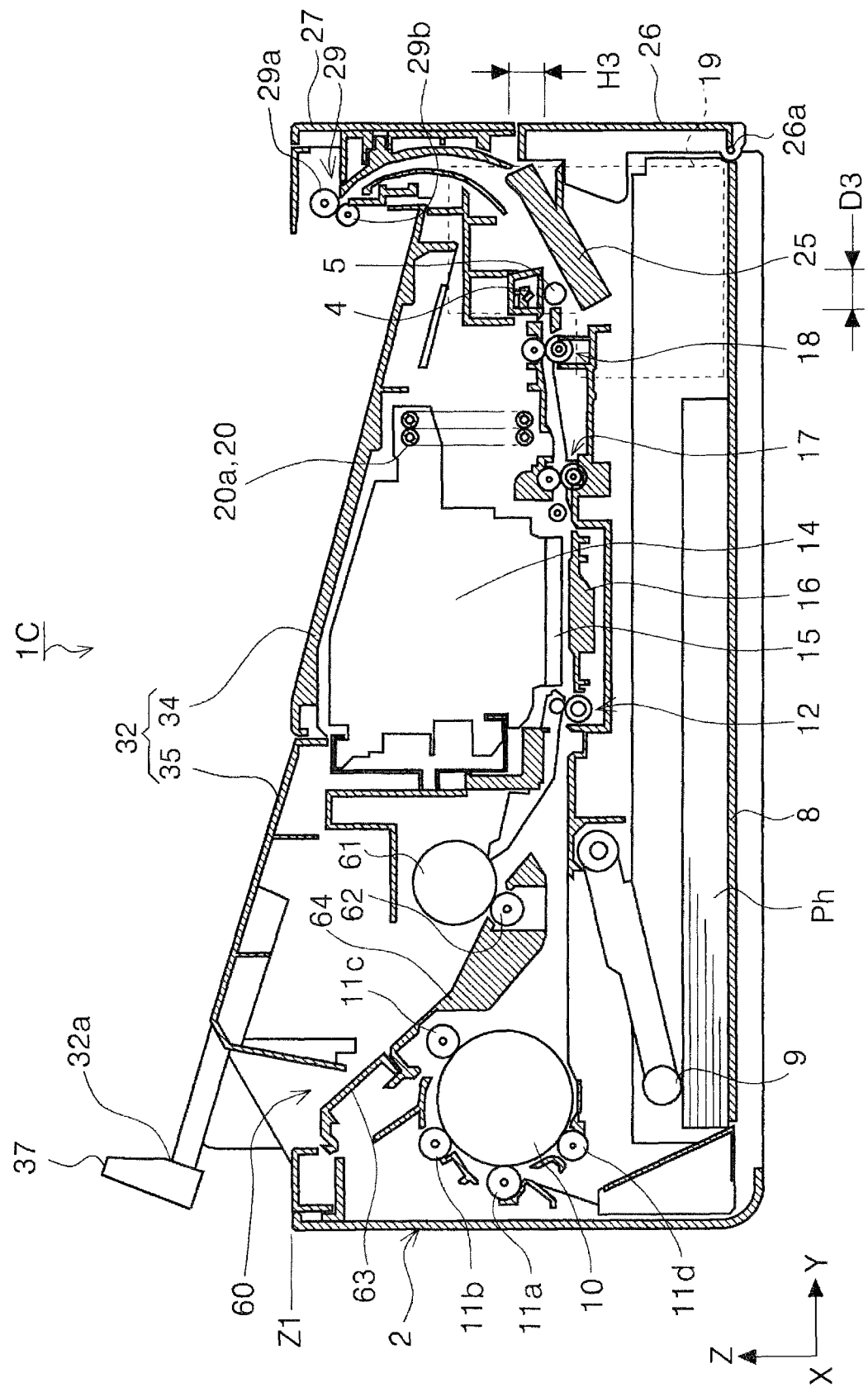
FIG. 6 is a vertical sectional view showing a sheet transport path of the printer.

Another embodiment of the printer will be described with reference to FIG. 6. A printer 1C shown in FIG. 6 is characterized in that the reading unit 4 is provided in the sheet discharge path.

More specifically, the reading unit 4 is provided downstream of the second intermediate roller pair 18 and at a position facing the path-switching flap 25.

This position is within the first sheet discharge path R3 shown in FIG. 1 and is also within the second sheet discharge path R4 shown in FIG. 2.

Hence, in either case where the first sheet discharge path R3 is selected or the second sheet discharge path R4 is selected, the reading unit 4 can read a side of a sheet.

The provision of the reading unit 4 in the sheet discharge path reduces the size of the overall apparatus. In addition, it is possible to ensure a sufficient area for the sheet receiving portion 32 for receiving the discharged sheet, improving ease of taking out the discharged sheet.

Furthermore, the provision of the reading unit 4 in the sheet discharge path makes it possible to read the contents recorded by the recording head 15. This makes it possible to, for example, record and read a nozzle check pattern, enabling a control unit of the printer to grasp the state of ink discharge nozzles of the recording head 15 for an automatic maintenance operation, such as cleaning of the ink discharge nozzles and adjustments of the nozzle positions. These advantages can also be obtained in the embodiment described above with reference to FIGS. 1 to 5.

As described above, in this embodiment, the reading unit 4 is provided at an upstream position in the first sheet discharge path R3, serving as the face-down discharge path, through which position a sheet discharged via the second sheet discharge path R4, serving as the face-up discharge path, passes. Hence, in either case where the first sheet discharge path R3 is selected or the second sheet discharge path is selected, the reading unit 4 can read the side of the sheet, improving the usability.

However, the reading unit 4 may be provided somewhere in the first sheet discharge path R3, serving as the face-down discharge path, so that the reading unit 4 can be used only when the first sheet discharge path R3 is selected, or may be provided somewhere in the second sheet discharge path R4, serving as the face-up discharge path, so that the reading unit 4 can be used only when the second sheet discharge path R4 is selected.

Alternatively, the reading unit 4 may be provided not in the sheet discharge paths, but at a position upstream of the recording head 15. For example, in this embodiment, the reading unit 4 may be provided between the reversing roller 10 and the transport roller pair 12.

Other characteristics of the above-described embodiments will be described.

Figure 5:
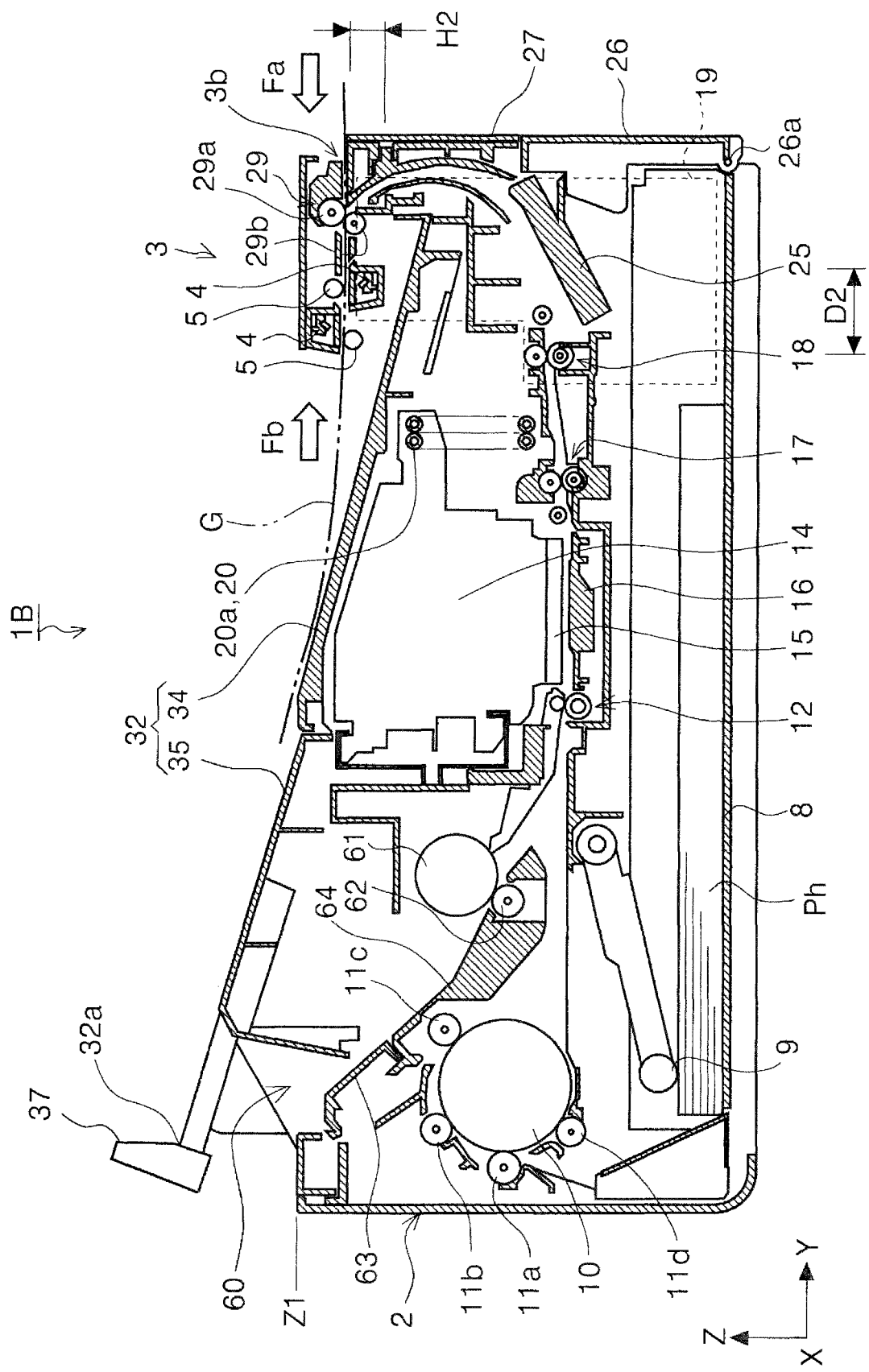
FIG. 5 is a vertical sectional view showing a sheet transport path of the printer.

In the printer 1B shown in FIG. 5 and in the printer 1C shown in FIG. 6, the carriage 14 and the reading unit 4 partially overlap each other in the vertical direction. The carriage 14 and the reading unit 4 overlap each other in the vertical direction at area H2 in FIG. 5 and area H3 in FIG. 6. This configuration reduces the vertical dimension of the recording apparatus.

In the printer 1A shown in FIG. 4, the printer 1B shown in FIG. 5, and the printer 1C shown in FIG. 6, the reading unit 4 is located on the front side of the apparatus with respect to the first intermediate roller pair 17, which is immediately downstream the recording head 15 in the sheet transport path, in the apparatus depth direction.

Furthermore, in the printer 1A shown in FIG. 4, the printer 1B shown in FIG. 5, and the printer 1C shown in FIG. 6, the reading unit 4 and the sheet container 8 partially overlap each other in the apparatus depth direction. The reading unit 4 and the sheet container 8 overlap each other in the apparatus depth direction at area D1 in FIG. 4, area D2 in FIG. 5, and area D3 in FIG. 6. This configuration reduces the depth dimension of the recording apparatus.

Furthermore, in the printer 1A shown in FIG. 4, the printer 1B shown in FIG. 5, and the printer 1C shown in FIG. 6, the reading unit 4 and the first sheet discharge path R3, serving as the face-down discharge path, partially overlap each other in the apparatus depth direction. The reading unit 4 and the first sheet discharge path R3 overlap each other in the apparatus depth direction at area D1 in FIG. 4, area D2 in FIG. 5, and area D3 in FIG. 6. This configuration reduces the depth dimension of the recording apparatus.

Furthermore, in the printer 1A shown in FIG. 4, the printer 1B shown in FIG. 5, and the printer 1C shown in FIG. 6, the reading unit 4 and the first sheet discharge path R3, serving as the face-down discharge path, partially overlap each other in the vertical direction. The reading unit 4 and the first sheet discharge path R3 overlap each other in the vertical direction at area H2 in FIG. 5 and area H3 in FIG. 6. This configuration reduces the vertical dimension of the recording apparatus.

Furthermore, in the printer 1A shown in FIG. 4, the printer 1B shown in FIG. 5, and the printer 1C shown in FIG. 6, the reading unit 4 is located below, in the vertical direction, the downstream end of the sheet receiving portion 32 in the sheet discharging direction. Reference sign 32a in in FIGS. 4, 5, and 6 denotes the downstream end of the sheet receiving portion 32 in the sheet discharging direction. This configuration reduces the vertical dimension of the recording apparatus.

In the printer 1A shown in FIG. 4 and the printer 1B shown in FIG. 5, the opening 3b from which the document is inserted into the document movement path 3a is located below, in the vertical direction, the downstream end 32a of the sheet receiving portion 32 in the sheet discharging direction. This configuration reduces the vertical dimension of the recording apparatus.

Furthermore, in the printer 1A shown in FIG. 4, the printer 1B shown in FIG. 5, and the printer 1C shown in FIG. 6, the reading unit 4 is located on the rear side of the apparatus with respect to the discharge roller pair 29 in the apparatus depth direction. This configuration reduces the depth dimension of the recording apparatus.

The printer 1B shown in FIG. 5 and the printer 1C shown in FIG. 6 have the feed port 60 from which the sheet to be fed is inserted, and at least a portion of the reading unit 4 is located below the feed port 60 in the vertical direction. Reference sign Z1 in FIGS. 5 and 6 shows the position of the feed port 60 in the vertical direction. This configuration reduces the vertical dimension of the recording apparatus.

Figure 7:
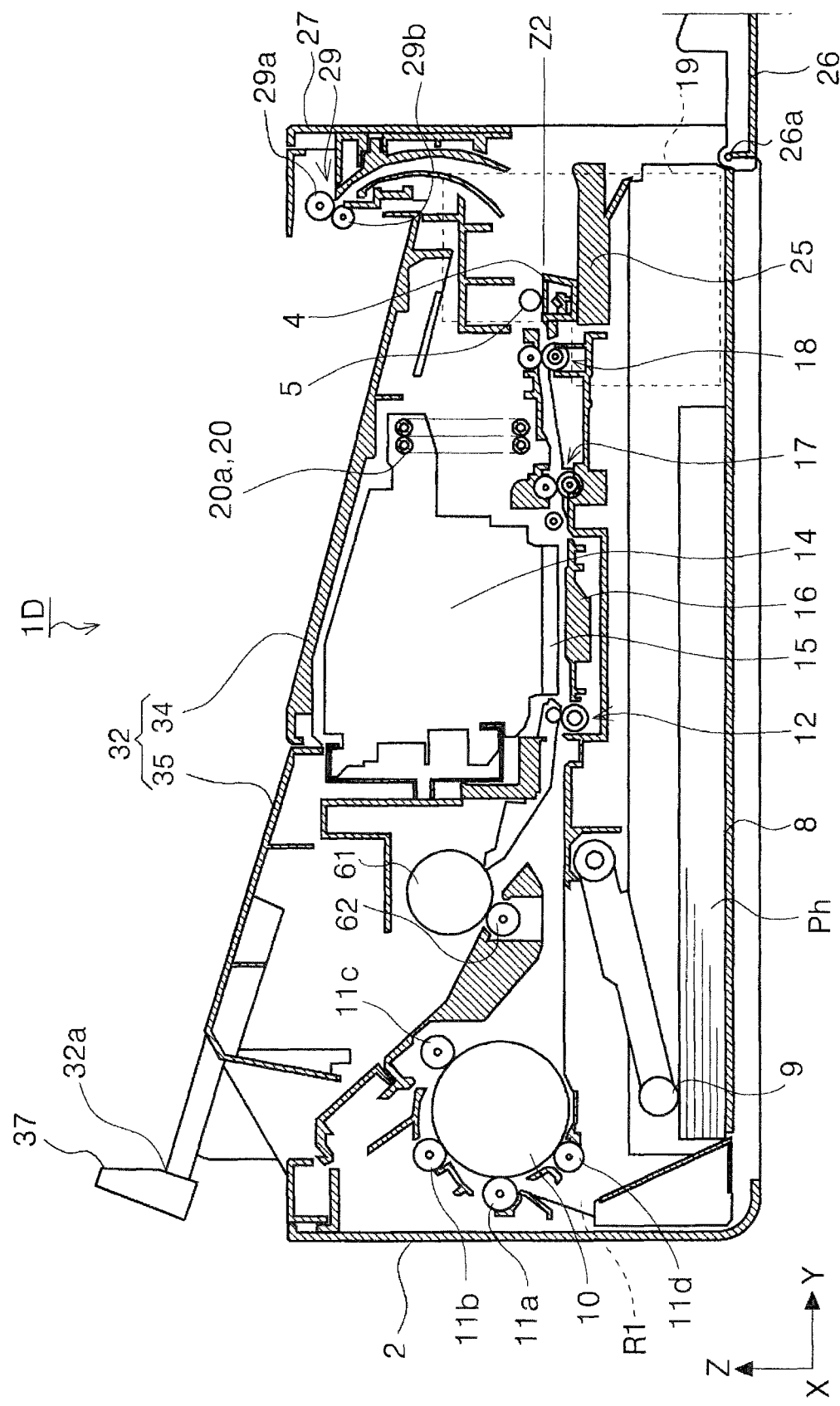
FIG. 7 is a vertical sectional view showing a sheet transport path of the printer.

In a printer 1D shown in FIG. 7, at least a portion of the reading unit 4 is located below, in the vertical direction, the sheet discharging position of the second sheet discharge path R4 (FIG. 2), serving as the face-up discharge path.

In the printer 1D shown in FIG. 7, unlike the printer 1C described with reference to FIG. 6, the reading unit 4 is located below the transport roller 5. Reference sign Z2 in FIG. 7 denotes the sheet discharging position, in the vertical direction, at the time of face-up discharging. With this configuration, in which at least a portion of the reading unit 4 is located below the sheet discharging position Z2 in the vertical direction at the time of face-up discharging, the vertical dimension of the recording apparatus is reduced.

In the printer 1A shown in FIG. 4, the printer 1B shown in FIG. 5, and the printer 1C shown in FIG. 6, at least a portion of the reading unit 4 is located on the front side of the apparatus with respect to the deformable section 20a of the tube 20 in the apparatus depth direction.

Furthermore, at least a portion of the reading unit 4 is located above the deformable section 20a of the tube 20 in the vertical direction.

In the printer 1B shown in FIG. 5 and the printer 1C shown in FIG. 6, the reading unit 4 partially overlaps the ink tank 19 (see FIG. 8) in the vertical direction. The reading unit 4 and the ink tank 19 overlap each other in the vertical direction at area H2 in FIG. 5 and area H3 in FIG. 6. This configuration reduces the vertical dimension of the recording apparatus.

The reading unit 4 and the ink tank 19 (see FIG. 8) partially overlap each other also in the apparatus depth direction. The reading unit 4 and the ink tank 19 overlap each other in the apparatus depth direction at area D2 in FIG. 5 and area D3 in FIG. 6. This configuration reduces the depth dimension of the recording apparatus.

As shown in FIG. 8, in the printer 1A, the ink tank 19 is located at the side of the reading unit 4 in the apparatus width direction.

The present disclosure is not limited to the above-described embodiments and can be variously modified within the scope described in the attached claims, and it is of course understood that such modifications are also included in the scope of the present disclosure.

What is claimed is:

1. A recording apparatus comprising:
   a recording unit that is configured to perform recording on a medium;
   a housing in which the recording unit is provided;
   a reading unit that is configured to the content recorded by the recording unit and that is provided in the housing;
   a document movement path along which the document moves; and
   wherein the recording unit and the reading unit partially overlap each other in a vertical direction.

2. The recording apparatus according to claim 1, further comprising a reversing roller that is configured to reverse the medium,
   wherein the reversing roller and the reading unit partially overlap each other in the vertical direction.

3. The recording apparatus according to claim 1, further comprising a reversing roller that is configured to reverse the medium,
   wherein the reversing roller and the document movement path partially overlap each other in the vertical direction.

4. The recording apparatus according to claim 1, wherein the recording unit and the document movement path partially overlap each other in the vertical direction.

5. The recording apparatus according to claim 1, further comprising a reversing roller that is configured to reverse the medium,
   wherein the reading unit is located downstream the reversing roller in a medium transport direction in which the medium is transported during recording.

6. The recording apparatus according to claim 1, further comprising a medium container that accommodates the medium and a pickup roller that feeds the medium in the medium container, wherein the reading unit is located downstream the pickup roller in a medium transport direction in which the medium is transported during recording.

7. The recording apparatus according to claim 1, wherein a part of the document movement path is configured to pass through the medium recorded by the recording unit.

8. The recording apparatus according to claim 1, further comprising a medium discharging section that is configured to discharge the medium on which recording has been performed and a medium receiving section that is configured to receive the medium discharged by the medium discharging section;

wherein the document is discharged by the medium discharging section to the medium receiving section.

9. The recording apparatus according to claim 8, wherein the medium on which recording has been performed is configured to be transported in the document movement path as the document, and the document optically scanned by the reading unit is discharged by the medium discharging section to the medium receiving section.

10. The recording apparatus according to claim 1, wherein the discharging unit is configured to discharge the medium on which recording has been performed by the recording unit with a most-recently recorded side thereof facing up.

11. A recording apparatus comprising:

a recording unit that is configured to perform recording on a medium;

a housing in which the recording unit is provided;

a reversing roller that is configured to reverse the medium;

a reading unit that reads a document and that is provided in the housing;

a document movement path along which the document moves; and wherein the reversing roller and the reading unit partially overlap each other in a vertical direction.

12. The recording apparatus according to claim 11, wherein the reversing roller and the document movement path partially overlap each other in the vertical direction.

13. The recording apparatus according to claim 11, wherein the recording unit and the document movement path partially overlap each other in the vertical direction.

14. The recording apparatus according to claim 11, wherein the reading unit is located downstream the reversing roller in a medium transport direction in which the medium is transported during recording.

15. The recording apparatus according to claim 11, further comprising a medium container that accommodates the medium; and a pickup roller that is configured to feed the medium in the medium container, wherein the reading unit is located downstream the pickup roller in a medium transport direction in which the medium is transported during recording.

16. The recording apparatus according to claim 11, wherein a part of the document movement path is configured to pass through the medium recorded by the recording unit.

17. The recording apparatus according to claim 11, further comprising a medium discharging section that is configured to discharge the medium on which recording has been performed and a medium receiving section that is configured to receive the medium discharged by the medium discharging section;

wherein the document is discharged by the medium discharging section to the medium receiving section.

18. The recording apparatus according to claim 17, wherein the medium on which recording has been performed is transported in the document movement path as the document, and the document optically scanned by the reading unit is discharged by the medium discharging section to the medium receiving section.

19. The recording apparatus according to claim 11, wherein the discharging unit is configured to discharge the medium on which recording has been performed by the recording unit with a most-recently recorded side thereof facing up.

20. A recording apparatus comprising:

a recording unit that is configured to perform recording on a medium;

a housing in which the recording unit is provided;

a reading unit that is configured to optically scan an entire document and that is provided in the housing;

a document movement path along which the document moves; and wherein the recording unit and the reading unit partially overlap each other in a vertical direction.

* * * * *